(12) United States Patent
Moy et al.

(10) Patent No.: US 6,342,543 B1
(45) Date of Patent: Jan. 29, 2002

(54) AMINE CURABLE FOUNDRY BINDER SYSTEM

(75) Inventors: Thomas M. Moy, Hilliard; Raymond Scott Harvey, Worthington; Edward G. Toplikar, Hilliard; Gary M. Carlson, Dublin; Don Greg Hendershot, Columbus, all of OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 09/404,758

(22) Filed: Sep. 24, 1999

(51) Int. Cl.$^7$ ................................ B22C 1/22
(52) U.S. Cl. .................. 523/142; 523/139; 523/143
(58) Field of Search ................... 523/139, 142, 523/143, 145

(56) References Cited

U.S. PATENT DOCUMENTS

| | | | |
|---|---|---|---|
| 3,409,579 A | * 11/1968 | Robins | 260/30.4 |
| 5,169,910 A | 12/1992 | Corley | 525/481 |
| 5,459,178 A | 10/1995 | Chan et al. | 523/139 |
| 5,539,017 A | 7/1996 | Rheinberger et al. | 523/116 |
| 5,596,021 A | 1/1997 | Adembri et al. | 521/99 |
| 5,880,175 A | 3/1999 | Archibald, et al. | 523/142 |
| 5,886,116 A | 3/1999 | Trumbo | 526/304 |
| 6,017,588 A | * 1/2000 | Wanatabe et al. | 427/407.1 |

OTHER PUBLICATIONS

Eastman MSDS—Developmental Polyols, "Acetoacetylation: A Process for Polyol Viscosity Reduction"; Publication No. U–50, Oct. 1993.

* cited by examiner

Primary Examiner—Edward J. Cain
Assistant Examiner—Wyrozebski-Lee Kataryna
(74) Attorney, Agent, or Firm—David L. Hedden

(57) ABSTRACT

The subject invention relates to a foundry binder system that cures in the presence of a volatile amine curing catalyst. The binder system comprises (a) a compound containing at least two active methylene hydrogen atoms, (b) an organic polyisocyanate (c) a reactive unsaturated acrylic monomer and/or polymer, (d) an oxidizing agent, and preferably (e) an epoxy component. The foundry binders are used for making foundry mixes. The foundry mixes are used to make foundry shapes that are used to make metal castings.

14 Claims, No Drawings

US 6,342,543 B1

AMINE CURABLE FOUNDRY BINDER SYSTEM

FIELD OF THE INVENTION

The subject invention relates to a foundry binder system that cures in the presence of a volatile amine curing catalyst. The binder system comprises (a) a compound containing at least two active methylene hydrogen atoms, (b) an organic polyisocyanate (c) a reactive unsaturated acrylic monomer and/or polymer, (d) an oxidizing agent, and preferably (e) an epoxy component. The foundry binders are used for making foundry mixes. The foundry mixes are used to make foundry shapes that are used to make metal castings.

BACKGROUND OF THE INVENTION

In the foundry industry, one of the procedures used for making metal parts is "sand casting". In sand casting, disposable foundry shapes, e.g. molds and cores, are fabricated with a mixture of sand and an organic or inorganic binder. The foundry shapes are arranged in molding assembly, which results in a cavity through which molten metal will be poured. After the molten metal is poured into the assembly of foundry shapes, the metal part formed by the process is removed from the molding assembly. The binder is needed so the foundry shapes do not disintegrate when they come into contact with the molten metal. In order to obtain the desired properties for the binder, various solvents and additives are typically used with the reactive components of the binders to enhance the properties needed.

Two of the prominent fabrication processes used in sand casting are the no-bake and the cold-box processes. In the no-bake process, a liquid curing catalyst is mixed with an aggregate and binder to form a foundry mix before shaping the mixture in a pattern. The foundry mix is shaped by compacting it in a pattern, and allowing it to cure until it is self-supporting. In the cold-box process, a volatile curing catalyst is passed through a shaped mixture (usually in a corebox) of the aggregate and binder to form a cured foundry shape.

There are many requirements for a binder system to work effectively. For instance, the binder must have a low viscosity, be gel-free, and remain stable under use There are many requirements for a binder system to work effectively. For instance, the binder must have a low viscosity, be gel-free, and remain stable under use conditions. In order to obtain high productivity in the manufacturing of foundry shapes, binders are needed that cure efficiently, so the foundry shapes become self-supporting and handleable as soon as possible.

With respect to no-bake binders, the binder must produce a foundry mix with adequate worktime and striptime to allow for the fabrication of larger cores and molds. On the other hand, cold-box binders must produce foundry mixes that have adequate benchlife, shakeout, and nearly instantaneous cure rates. The foundry shapes made with the foundry mixes using either no-bake or cold-box binders must have adequate tensile strengths (particularly immediate tensile strengths), scratch hardness, and show resistance to humidity.

One of the greatest challenges facing the formulator is to formulate a binder that will hold the foundry shape together after is made so it can be handled and will not disintegrate during the casting process[1], yet will shakeout from the pattern after the hot, poured metal cools. Without this property, time consuming and labor intensive means must be utilized to break down the binder so the metal part can be removed from the casting assembly. This is particularly a problem with internal cores, which are imbedded in the casting assembly and not easily removed. Another related property required for an effective foundry binder is that foundry shapes made with the binder must release readily from the pattern.

[1]Casting temperatures of poured metal reach 1500° C. for iron and 700° for aluminum parts.

The flowability of a foundry mix made from sand and an organic binder can pose greater problems with respect to cold-box applications. This is because, in some cases, the components of the binder, particularly the components of phenolic urethane binders, may prematurely react after mixing with sand, while they are waiting to be used. If this premature reaction occurs, it will reduce the flowability of the foundry mix and the molds and cores made from the binder will have reduced tensile strengths. This reduced flowability and decrease in strength with time indicates that the "benchlife" of the foundry mix is inadequate. If a binder results in a foundry mix without adequate benchlife, the binder is of limited commercial value.

In view of all these requirements for a commercially successful foundry binder, the pace of development in foundry binder technology is gradual. It is not easy to develop a binder that will satisify all of the requirements of interest in a cost effective way. Also, because of environmental concerns and the cost of raw materials, demands on the binder system may change. Moreover, an improvement in a binder may have some drawback associated with it. In view of these requirements, the foundry industry is continuously searching for new binder systems that will better meet them.

One of the most successful binders used in the cold-box process for making foundry shapes is the phenolic-urethane binder. The phenolic-urethane binder comprises a phenolic resin component and a polyisocyanate component that are mixed with an aggregate to form a foundry mix. The foundry mix is blown into pattern, typically a corebox, where it is cured by passing a volatile tertiary amine catalyst through it to form a cured foundry shape. Phenolic-urethane binders are widely used in the foundry industry to bond the sand cores and molds used in casting iron and aluminum. An example of a commonly used phenolic-urethane binder used in the cold-box process is disclosed in U.S. Pat. No. 3,409,575, which is hereby incorporated by reference. More recently amine curable cold-box binders based on acrylic-epoxy-isocyanate were developed. These binders are disclosed in U.S. Pat. No. 5,880,175, which is hereby incorporated by reference.

SUMMARY OF THE INVENTION

The invention relates to a foundry binder system which will cure in the presence of a volatile amine curing catalyst comprising:

(a) from 1 to 70 weight percent of compound having at least two active methylene hydrogen atoms selected from the group consisting of monofunctional and multifunctional acetoacetates, diketones, malonates, acetoacetamides, cyanoacetates, and mixtures thereof;

(b) from 10 to 70 weight percent of an organic polyisocyanate;

(c) from 5 to 70 weight percent of a reactive unsaturated acrylic monomer, acrylic polymer, and mixtures thereof; and (d) an effective oxidizing amount of an oxidizing agent, where (a), (b), (c), and (d) are separate components or can be mixed with another component, provided (b) or (c)

is not mixed with (d), and the weight percent is based upon the total weight of the binder system.

Preferably the binder system also contains (e) an epoxy component in an amount of from 1 to 40 weight percent.

The foundry binders are used for making foundry mixes. The foundry mixes are used to make foundry shapes which are used to make metal castings. Foundry shapes made with the binder systems have higher immediate tensile strengths than foundry shapes prepared with comparable acrylic-epoxy-isocyanate binders shown in U.S. Pat. No. 5,880,175 that do not contain an acetoacetate. This improvement is commercially significant in terms of handling the foundry shapes after they are made. Because the tensile strength of the core builds up faster, a foundry can use less binder and catalyst than used in the binder systems shown in U.S. Pat. No. 5,880,175 without sacrificing tensile strengths. Additionally, the binder does not contain any free phenol or free formaldehyde, and has zero or low volatile organic compounds (VOC). Foundry shapes made with binders are resistant to sagging even after storage, which is important in producing castings that are dimensionally accurate.

BEST MODE AND OTHER MODES OF PRACTICING THE INVENTION

It is preferred to package and use the binders system as a two part system. The Part I component comprises (a)[2] a compound having at least two active methylene hydrogen atoms selected from the group consisting of monofunctional and multifunctional acetoacetates, diketones, malonates, acetoacetamides, cyanoacetates, and mixtures thereof, preferably a monofunctional and multifunctional acetoacetates; (d) an oxidizing agent; and preferably (e) an epoxy component. The Part I may also contain other optional components such as solvents. The Part II component comprises (b) an organic polyisocyanate; (c) a reactive unsaturated acrylic monomer, polymer, or mixture thereof; and optional components such as solvents. Usually, the Part I is first mixed with sand and then the Part II is added to make a foundry mix which is shaped and cured.

[2]Throughout the specification and claims, "(a)" will refer to the component having at least two active methylene hydrogen atoms, "(b)" will refer to the organic polyisocyanate component, "(c)" will refer to the acrylate component, (d) will refer to the oxidizing agent component, and (e) will refer to the epoxy component.

The general structures, (I) and (II), for compounds having at least two active methylene hydrogen atoms follows, where structure (I) relates to monofunctional compounds and structure (II) relates to multifunctional acetoacetates, where $n \geq 2$, such as di-, tri-, and tetraacetoacetates as well as polymeric acetoacetates, i.e., acetoacetate derivatives of polyvinyl alcohol or hydroxyethyl(meth)acrylate copolymers. The structural feature common to all of these compounds is the methylene group located between a carbonyl group and some other electron withdrawing group, e.g. a ketone, ester, amide, or nitrile (cyano) group. The bold "$CH_2$" indicates the active methylene portion of the molecule:

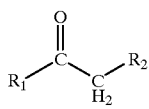

(I)

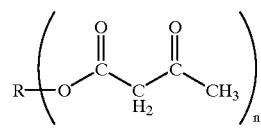

(II)

where $R_1 = R$, RO, RNH, $R_2$N; R is an alkyl group where the number of carbon atoms is $\geq 1$, typically less than 12 carbon atoms, or an aryl or substituted aryl group where the number of carbon atoms is $\geq 6$; where $R_2$ is a strong electron withdrawing group such as a ketone, ester, amide, or nitrile (cyano) group; and where n is an integer >2.

Structure (II) relates to multifunctional acetoacetatses having multiple pairs of active methylene hydrogen atoms. Aetoacetates containing multiple pairs of methylene active hydrogen atoms are prepared by the transesterification of a glycol or polyol with a monofunctional acetoacetate. Likewise malonates (prepared from glycols or polyols) and acetoacetamides or cyanoacetamides (prepared from compounds with multiple primary or secondary amino groups) that have multiple pairs of active methylene hydrogen atoms are also contemplated.

Specific groups of compounds having at least two active methylene hydrogen atoms are illustrated below.

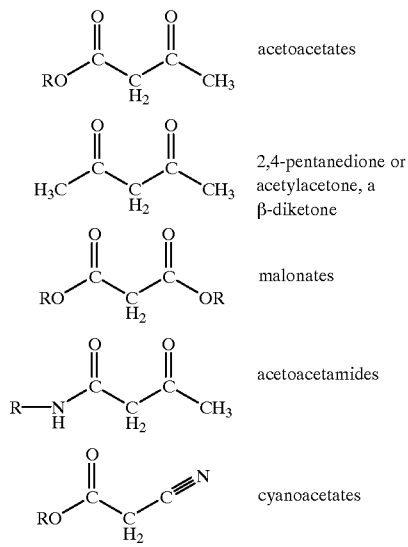

The preferred compounds having at least two active methylene hydrogen atoms are mono- and multifunctional acetoacetates, most preferably multifunctional acetoacetates. The active methylene hydrogen atoms of the acetoacetate are reactive with the organic polyisocyanate of the binder. Monofunctional acetoacetates having one pair of active methylene hydrogen atoms are prepared according to well known methods that involve reacting an ester of acetic acid in the presence of metallic sodium. The preferred acetoacetates are multifunctional acetoacetates that contain more than one pair of active methylene hydrogen atoms and are prepared according to well known methods by the transesterification of a multifunctional, hydroxyl compound, or blends thereof, with a monofunctional alkyl acetoacetate, preferably ethyl or t-butyl acetoacetate, to liberate an alkyl alcohol and a multifunctional acetoacetate. The reaction takes place in the presence of a transesterification catalyst, such as triphenylphosphite at a temperature of 120 ° C. to 150° C. Total or partial transesterification can be obtained depending upon the equivalent ratio of hydroxyl compound to acetoacetate used.

The multifunctional hydroxy group may be derived from any hydroxyl containing compound, for instance 1,3-butane diol, 1,4-butane diol, 1,2-, 1,3- or 1,4-cyclohexanedimethanol, diethylene glycol, dimethylol propionic acid, dipropylene glycol, ethylene glycol, 1,6-hexanediol, hexylene glycol, neopentyl glycol, 1,5-pentanediol, propylene glycol, tetraethylene glycol, triethylene glycol, trimethylene glycol, trimethylpentanediol, glycerine, trimethylol ethane, trimethylol propane, pentaerythritol, and combinations of two or more of these. Preferably used as the polyhydroxyl compound are hydroxyl compounds with an average functionality of 2 to 4 such as glycerine, trimethylol ethane, trimethylol propane, pentaerythritol, and mixtures thereof, which will result in compounds having more two or more acetoacetate moieties.

Typical acetoacetates which can be used to prepare the multifunctional acetoacetates include methyl acetoacetate, ethyl acetoacetate, and butyl acetoacetate. Typical multifunctional acetoacetates include cyclohexanedimethanol bis-acetoacetate, glycerol triacetoacetate, neopentyl glycol bis-acetoacetate, ethylene glycol bisacetoacetate, acetoacetylated polyvinyl alcohols, acetoacetylated polyester resins, and mixtures thereof. Preferably used as the multifunctional acetoacetates are trimethylolpropane tris-acetoacetate, glycerol triacetoacetate, pentaerydiritol tetrakis-acetoacetate, and diethyleneglycol diacetoacetate.

Most typically the epoxy component used in the Part I comprises an epoxy resin (e). An "epoxy resin" is defined as a thermosetting resin that contains one or more reactive epoxide group per molecule. Such resins have either a mixed aliphatic-aromatic or exclusively non-aromatic (i.e., aliphatic or cycloaliphatic) molecular structure. The mixed aliphatic-aromatic epoxy resins generally are prepared by the well-known reaction of a bis-(hydroxy-aromatic)alkane or a tetrakis-(hydroxy-aromatic)alkane with a halogen-substituted aliphatic epoxide in the presence of a base such as sodium hydroxide or potassium hydroxide. Examples of the halogen-substituted aliphatic epoxides include epichlorohydrin, 4-chloro-1,2-epoxybutane, 5-bromo-1,2-epoxypentane, 6-chloro-1,3-epoxyhexane and the like. In general, it is preferred to use a chloride substitute terminal denoting that the epoxide group is on the end of the alkyl chain.

The most widely used epoxy resins are diglycidyl ethers of bisphenol A. These are made by reaction of epichlorohydrin with bisphenol A in the presence of an alkaline catalyst. By controlling the operating conditions and varying the ratio epichlorohydrin to bisphenol A, products of different molecular weight can be made. Other epoxy resins include (a) the diglycidyl ethers of other bisphenol compounds such as bisphenol B, F, G, and H, (b) epoxy resins produced by reacting a novolac resin with a halogen-substituted aliphatic epoxide such as epichlorohydrin, 4-chloro-1,2-epoxybutane, 5-bromo-1,2-epoxypentane, 6-chloro-1,3-epoxyhexane and the like, (c) epoxidized polybutadiene resins, and (d) epoxidized drying oils.

Particularly preferred are epoxy resins with a weight per epoxy group of 175 to 200. Although the viscosities of the epoxy resins are high, usually greater than 5,000 cps at 25° C., the epoxy component viscosity is reduced to a workable level when the epoxy resin is mixed with the oxidizing agent. Useful epoxy resins are disclosed in U.S. Pat. No. 4,518,723 which is hereby incorporated by reference into this disclosure.

The oxidizing agent (d), preferably used in the Part I component, is a peroxide and/or hydroperoxide. Examples include ketone peroxides, peroxy ester oxidizing agents, alkyl oxides, chlorates, perchlorates, and perbenzoates. Preferably, however, the oxidizing agent is a hydroperoxide or a mixture of peroxide and hydroperoxide. Hydroperoxides particularly preferred in the invention include t-butyl hydroperoxide, cumene hydroperoxide, paramenthane hydroperoxide, etc. The organic peroxides may be aromatic or alkyl peroxides. Examples of useful diacyl peroxides include benzoyl peroxide, lauroyl peroxide and decanoyl peroxide. Examples of alkyl peroxides include dicumyl peroxide and di-t-butyl peroxide.

Although not necessarily preferred, the Part I component, may contain a solvent, such as an aromatic hydrocarbon solvent such as benzene, toluene, xylene, ethylbenzene, naphthalenes, or an ester solvent, such as rapeseed methyl ester, or mixtures thereof, and the like. If a solvent is used, sufficient solvent should be used so that the resulting viscosity of the Part I is less than 1,000 centipoise, preferably less than 400 centipoise. Generally, however, the total amount of solvent is used in an amount of 0 to 25 weight percent based upon the total weight of the epoxy resin.

Any organic polyisocyanate (b) can be used in the Part II component. Examples of organic polyisocyanate used include organic polyisocyanates having a functionality of two or more, preferably 2 to 5. It may be aliphatic, cycloaliphatic, aromatic, or a hybrid polyisocyanate, or mixtures. Representative examples of organic polyisocyanates are aliphatic polyisocyanates such as hexamethylene diisocyanate, alicyclic polyisocyanates such as 4,4'-dicyclohexylmethane diisocyanate, and aromatic polyisocyanates such as 2,4-diphenylmethane diisocyanate and 2,6-toluene diisocyanate, and dimethyl derivatives thereof. Other examples of suitable organic polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2,4-diisocyanate, and the like. The organic polyisocyanate is used in a liquid form. Solid or viscous polyisocyanates must be used in the form of organic solvent solutions, the solvent generally being present in a range of up to 80 percent by weight of the solution.

Particularly preferred as the organic polyisocyanate are acrylated polyisocyanates. The acrylated polyisocyanates may be a "partially" or "totally" acrylated organic polyisocyanate". A totally acrylated organic polyisocyanate is an organic polyisocyanate wherein all of the isocyanato (NCO) groups of the organic polyisocyanate are reacted with a hydroxyl or carboxylic acid containing unsaturated acrylic monomer, acrylic polymer, or mixtures thereof. A partially acrylated organic polyisocyanate contains "free or unreacted" isocyanato groups. The term "acrylated organic polyisocyanate" includes mixtures of acrylated organic polyisocyanates and organic polyisocyanates which are not acrylated and have free isocyanato groups (NCO groups).

The acrylated organic polyisocyanate must contain some free NCO, which is either found in the molecules of the partially acrylated organic polyisocyanate and/or in organic polyisocyanates having free NCO which are mixed with the totally acrylated organic polyisocyanate. Although any acrylated organic polyisocyanate can be blended with an organic polyisocyanate, it is necessary to blend totally acrylated organic polyisocyanates with an organic polyisocyanate having free NCO, since the totally acrylated organic polyisocyanates do not have free NCO groups. Typically the amount of organic polyisocyanate blended with the acrylated organic polyisocyanate is from 0 to about 98 weight, based upon the combined weight of the acrylated organic polyisocyanate and the organic polyisocyanate blended with it, preferably from 2 to 98 weight percent. The acrylated polyisocyanate (which includes blends of acrylated organic polyisocyanates, whether they be totally or partially acrylated, and organic polyisocyanates which are not acrylated), typically contains at least 5 weight percent free NCO and typically no more than 31 weight percent free NCO, where the weight percent is based upon the weight of the acrylated isocyanate.

The acrylated organic polyisocyanate is prepared by reacting the organic polyisocyanate with typically from 2 to 49 weight percent, preferably from 2 to 30 weight percent, of a reactive unsaturated acrylic monomer or polymer having a free hydroxyl or free carboxylic acid functional group. The general procedure for preparing the acrylated organic polyisocyanate involves heating the acrylic monomer or polymer in the presence of the organic polyisocyanate until all of the hydroxy or carboxylic acid component has reacted.

Typical acrylic monomers that can be used as the reactive unsaturated acrylic monomer to prepare the acrylated organic polyisocyanates include hydroxyalkyl acrylates, carboxylic acid containing acrylates, alkoxyalkyl acrylates, hydroxyalkyl methacrylates, alkoxyalkyl methacrylates, N-alkoxymethylacrylamides, N-alkoxymethylmethacrylamides, and mixtures thereof. Preferably used as the monomers to modify the organic polyisocyanate are acrylic monomers selected from the group consisting of acrylic acid, methacrylic acid, substituted variations of acrylic acid or methacrylic acid, hydroxy ethyl acrylate, and hydroxy propyl acrylate.

Typical acrylic polymers that can be used as the reactive unsaturated polymer to prepare the acrylated organic polyisocyanates include epoxy acrylate reaction products, polyester/urethane/acrylate reaction products, acrylated urethane oligomers, polyether acrylates, polyester acrylates, acrylated epoxy resins, vinyl polyesters, vinyl esters, and dicylopentadiene resins.

The organic polyisocyanate used to prepare the partially acrylated organic polyisocyanate are the same as those described previously, i.e. aliphatic, cycloaliphatic, aromatic, or a hybrid polyisocyanate.organic polyisocyanates having a functionality of two or more, preferably 2 to 5.

The reactive unsaturated acrylic monomer, polymer, or mixture thereof (d), preferably used in the Part II component, contains ethylenically unsaturated bonds, but does not contain any free hydroxyl or carboxylic acid functional groups. Examples of such materials include a wide variety of monofunctional, difunctional, trifunctional, tetrafunctional and pentafunctional monomeric acrylates and methacrylates. A representative listing of these monomers includes alkyl acrylates, acrylated epoxy resins, cyanoalkyl acrylates, alkyl methacrylates, cyanoalkyl methacrylates, and difunctional monomeric acrylates. Other acrylates which can be used include trimethylolpropane triacrylate, methacrylic acid and 2-ethylhexyl methacrylate. Typical reactive unsaturated acrylic polymers, which may also be used include epoxy acrylate reaction products, polyester/urethane/acrylate reaction products, acrylated urethane oligomers, polyether acrylates, polyester acrylates, and acrylated epoxy resins.

Although solvents are not required for the Part II component, they may be used. Typical solvents used are generally polar solvents, such as liquid dialkyl esters, e.g. dialkyl phthalate of the type disclosed in U.S. Pat. No. 3,905,934, and other dialkyl esters such as dimethyl glutarate. Methyl esters of fatty acids, particularly rapeseed methyl ester, are also useful solvents. Suitable aromatic solvents are benzene, toluene, xylene, ethylbenzene, and mixtures thereof Preferred aromatic solvents are mixed solvents that have an aromatic content of at least 90% and a boiling point range of 138° C. to 232° C. Suitable aliphatic solvents include kerosene.

Amounts of Components

Generally, the weight percent of (a) is 1 to 70, the weight percent of (b) is 10 to 70, the weight percent of (c) is 5 to 70 and the weight percent of (d) is 5 to 70, where the weight percent is based upon the total weight of the binder system. Preferably, the weight percent of (a) is 5 to 50, the weight percent of (b) is 10 to 55, the weight percent of (c) is 10 to 55, and the weight percent of (d) is 5 to 30. If an epoxy, component (e) is used, it used in an amount of 1 to 40 weight percent, preferably from 5 to 30 weight percent.

The weight ratio of acetoacetate to organic polyisocyanate generally is from 1:35 to 35:1, preferably from 1:15 to 15:1, most preferably from 1:10 to 10:1. The weight ratio of unsaturated acrylate to polyisocyanate is generally from 1:10 to 10:1, preferably from 1:5 to 5:1. The weight ratio of epoxy resin to acetoacetate is from 12:1 to 1:12, preferably from 1:3 to 3:1. The weight percent of oxidizing agent to organic polyisocyanate is from 20:1 to 1:20 preferably from 8:1 to 1:8.

Optional Components

Free radical scavengers or inhibitors such as benzoquinone can be added to the binder. Benzoquinone acts as a free radical inhibitor/scavenger to inhibit the free radical reactions that cause instability in the binder. The amount of benzoquinone used is generally from 0 to 3 weight percent, preferably 0 to 1 weight percent based upon the total weight of the binder. The benzoquinone may be incorporated into a solvent, which may be used in either the epoxy component (Part I) or the polyisocyanate component (Part I), or both. It is especially beneficial when used in the part containing the reactive unsaturated acrylic monomer or polymer.

It will be apparent to those skilled in the art that other additives such as silanes, silicones, benchlife extenders, release agents, defoamers, wetting agents, etc. can be added to the aggregate, or foundry mix. The particular additives chosen will depend upon the specific purposes of the formulator.

Aggregate

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used are known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sands, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

The foundry mix is molded into the desired shape and whereupon it is cured by the cold-box process. Curing by the cold-box process is carried out by contacting the foundry shape with a volatile tertiary amine as described in U.S. Pat. No. 3,409,579, which is hereby incorporated into this disclosure by reference. Examples of volatile tertiary amines which can be used include trimethylamine, dimethylethylamine, methyldiethylamine, triethylamine, dimethylethanolamine, and the like.

ABBREVIATIONS AND DEFINITIONS

The following abbreviations are used in the Examples:

| | |
|---|---|
| AHS | - aromatic hydrocarbon solvent having a boiling point from about 175° C. to 200° C. |
| CHP | - cumene hydroperoxide. |
| DEGAA | - diethyleneglycol diacetoacetate. |
| DEGDA | - diethylene glycol diacrylate. |
| DEGDMA | - diethylene glycol dimethacrylate. |
| EPOXY | - epoxy resin formed from the diglycidyl ether of bisphenol A. |
| GLYAA | - glycerol triacetoacetate. |
| HPA | - hydroxy propyl acrylate. |
| HPA/MDI | - polyphenylene polymethylene organic polyisocyanate having a functionality of about 2 to 3a partially acrylated with 5 weight percent HPA. |
| LOBS | - low odor base solvent. |
| RME | - rapeseed methyl ester solvent. |
| SIL | - silane. |
| TMPTA | - trimethylolpropane triacrylate. |

EXAMPLES

The examples will illustrate specific embodiments of the invention. These examples along with the written description will enable one skilled in the art to practice the invention. It is contemplated that many other embodiments of the invention will work besides these specifically disclosed. All parts are by weight and all temperatures are in ° C. unless otherwise specified. Controls or Comparative Examples are designated by letters.

Unless otherwise specified, the procedure used in the Examples to make test cores was to thouroughly mix 20 parts of the Part I component with sand, and then mix 80 parts of the Part II component with the mixture of sand and Part I. The binder level was 1.25 weight percent based on the weight of the sand (bos). The resulting foundry mix was blown into a core box, compacted, contacted with volatile triethylamine for about 1 second at a pressure of 20 psi, and purged with nitrogen at a pressure of about 18 psi for about 4 seconds to form cured AFS test cores (dogbone shaped). Total cycle time was about 20 seconds. This procedure is described in U.S. Pat. No. 3,409,579.

Tensile strengths of the test cores were measured at a variety of times according to AFS standard testing procedures. Measuring the tensile strength of the test cores enables one to predict how the mixture of sand and binder will work in actual foundry operations. In the Examples, the tensile strengths of the test cores were measured immediately (Imm), 5 minutes (5 min), one hour (1 hr), and 24 hours (24 hr) after curing. They were also measured 24 hours after being exposed to an environmnent having a relative humidity of 90% (90% RH). Tensile strengths of test cores coated with a core wash (CGW4/Baume 32–33) were also measured. Half of the corewash test cores were broken immediately after removal from a 175° C. oven (15 minutes) (hot cores) and the second half of the corewash test cores were broken 1 hr. after removal from the oven (cold cores).

Tests were also conducted on foundry mixes that aged five hours before making foundry shapes. As a foundry mix ages, lower tensile strengths are sometimes detected for the foundry shapes made with the aged mix. These lower tensile strengths indicate that the binder components reacted after mixing with the sand and prior to curing with amine gas. This pre-reaction results in foundry mixes that are not as flowable and foundry shapes that do not hold together as well.

The test conditions are set forth in the Tables shown with the Examples. The components used in the Examples are specified in Tables I and II, and the tensile strengths of the dog bone samples prepared with the various formulations are set forth in Tables that are shown with the Examples.

The Part I formulations used in the Examples are described in Table I.

TABLE I (Part I Formulations)

| | Component/Amount | | | | | | |
|---|---|---|---|---|---|---|---|
| Example | AA-TMP | GLYAA | DEGAA | EPOXY | CHP | RME | SIL |
| Control A | 0 | 0 | 0 | 50 | 40 | 10 | 0 |
| Control B | 0 | 0 | 0 | 60 | 39 | 0 | 1 |
| 1 | 60 | 0 | 0 | 0 | 39 | 0 | 1 |
| 2 | 30 | 0 | 0 | 10 | 39 | 0 | 1 |
| 3 | 0 | 30 | 0 | 30 | 39 | 0 | 1 |
| 4 | 0 | 0 | 30 | 30 | 39 | 0 | 1 |

Unless otherwise specified, the Part II formulation used in the examples is described in Table II.

TABLE II (Part II Formulation)

| Component | Amount (pbw based upon weight of Part II) |
|---|---|
| HPA/MDI | 38 |
| DEGDMA | 52 |
| LOBS | 5 |
| AHS | 5 |

Examples 5–6

Preparation of Test Cores

Test cores were prepared using formulations A, B, 1, and 2 as described in Table I, according to the procedure described for making test cores using Badger 5574 sand and nitrogen as the purge gas. The test results are set forth in Table III.

TABLE III (Tensile Profile of Test Cores)

| Example | Part I | Imm | 5 min | 1 hr | 24 hr | 90% RH | Hot CW | Cold CW |
|---|---|---|---|---|---|---|---|---|
| C[3] | A | 109 | 250 | 228 | 298 | 92 | 94 | 208 |
| D | B | 167 | 315 | 313 | 409 | 244 | 143 | 474 |

TABLE III-continued (Tensile Profile of Test Cores)

| Example | Part I | Imm | 5 min | 1 hr | 24 hr | 90% RH | Hot CW | Cold CW |
|---|---|---|---|---|---|---|---|---|
| 5 | 1 | 231 | 326 | 311 | 399 | 237 | 109 | 557 |
| 6 | 2 | 256 | 407 | 388 | 433 | 278 | 163 | 483 |

[3]TMPTA was substituted for the DEGDMA in the Part II of this binder. The amount of TMPTA was 56 weight percent and the amount of HPA/MDI was 56 weight percent.

The data in Table III indicate that, under the test conditions, the use of the acetoacetate greatly improves the immediate tensile of test cores made with the binder.

Example 7

Use of DEGDA in Part II Component

This example uses another acrylate (DEGDA) in the part II as a replacement for DEGMDA. In this Example the sand used was Wedron 540 and the purge gas was air. The results are shown in Table IV.

TABLE IV (Tensile Profile of Test Cores)

| Example | Part I | Imm | 5 min | 1 hr | 24 hr | 90% RH | Hot CW | Cold CW |
|---|---|---|---|---|---|---|---|---|
| E | B | 107 | 230 | 240 | 311 | 231 | 61 | 370 |
| 7 | 2 | 143 | 245 | 238 | 289 | 183 | 52 | 390 |

This Example illustrates that other acrylates can be used in the Part II. It also shows that air can be used as the purge gas instead of an inert atmosphere. Again, large improvements in immediate tensiles are observed.

Examples 8–10

Preparation of Test Cores Using other Acetoacetates.)

In these Examples, other acetoacetates were used in the Part I. The sand used was Manley 1L-5W and the purge gas was air. The results are shown in Table V.

TABLE V (Tenisle Profiles of Test Cores made with other Acetoacetates)

| Example | Part I | Imm | 5 min | 1 hr | 24 hr | 90% RH | Hot CW | Cold CW |
|---|---|---|---|---|---|---|---|---|
| F | A | Test cores broke in corebox. The edges were friable. | | | | | | |
| 8 | 2 | 225 | 221 | 166 | 300 | 95 | 47 | 227 |
| 9 | 3 | 179 | 243 | 192 | 290 | 89 | 42 | 189 |
| 10 | 4 | 185 | 211 | 157 | 264 | 81 | 34 | 181 |

The data in Table V demonstrate that various acetoacetates can be used to make acceptable cores under the test conditions.

Examples 11–13

Effect of the Age of Sand Mix on Tensile Profile

Test cores were made with a sand mix using Badger 5574 sand that was five hours old, i.e. mix having a five hour benchlife, when the test cores made. The purge gas was air. The test results are summarized in Table X.

TABLE X ((Tenisle Profiles of Test Cores made Sand having 5 hour benchlife)

| Example | Part I | Imm | 5 min | 1 hr | 24 hr | 90% RH | Hot CW | Cold CW |
|---|---|---|---|---|---|---|---|---|
| Control | A | No useful test samples could be made with this binder. | | | | | | |
| 11 | 2 | 258 | 279 | 274 | 344 | 160 | 61 | 376 |
| 12 | 3 | 235 | 259 | 251 | 311 | 105 | 60 | 319 |
| 13 | 4 | 200 | 234 | 214 | 274 | 97 | 36 | 303 |

The data in Table X demonstrates that sand mixes containing a binder with an acetoacetate can be used after aging, even when the purge gas is air.

We claim:

1. A foundry binder system comprising:
   (a) from 1 to 70 weight percent of compound having at least two active methylene hydrogen atoms selected from the group consisting of monofunctional and multifunctional acetoacetates, diketones, malonates, acetoacetamides, cyanoacetates, and mixtures thereof;
   (b) from 10 to 70 weight percent of an organic polyisocyanate;
   (c) from 5 to 70 weight percent of a reactive unsaturated acrylic monomer, polymer, and mixtures thereof; and
   (d) from 5 to 70 weight percent of an oxidizing agent,
   where (a), (b), (c), and (d) are separate components or mixed with another of said components, provided (b) or (c) is not mixed with (d), where said weight percents are based upon the total weight of (a), (b), (c), and (d), and which cures in the presence of a volatile amine curing catalyst.

2. The binder system of claim 1 wherein the compound containing at least two active methylene hydrogen atoms is a multifunctional acetoacetate.

3. The binder system of claim 2 wherein an epoxy component (e) is used as additional component in amount of from about 1 to 40 weight percent based upon the weight of the binder system.

4. The foundry binder system of claim 3 wherein the organic polyisocyanate is an acrylated organic polyisocyanate.

5. The foundry binders system of claim 4 wherein said binder system comprises two parts and the Part I comprises components (a), (d), and an epoxy component (e), where (e) comprises an epoxy resin, and Part II comprises components (b) and (c).

6. The foundry binder system of claim 5 wherein the weight percent of (a) is 3 to 40, the weight percent of (b) is 15 to 55, the weight percent of (c) is 20 to 55, the weight percent of (d) is 5 to 30, and the weight percent of the epoxy component is from 1 to 50 weight percent.

7. The foundry binder system of claim 6 wherein the acetoacetate is a multifunctional acetoacetate selected from the group consisting of trimethylolpropane tris-acetoacetate, glycerol triacetoacetate, pentaerythritol tetrakis-acetoacetate, and diethyleneglycol diacetoacetate.

8. The foundry binder system of claim 7 wherein the epoxy component comprises an epoxy resin epoxy resin formed from a diglycidyl ether of bisphenol A, bisphenol F, epoxy novolak resins and mixtures thereof.

9. The foundry binder system of claim 8 wherein the reactive unsaturated acrylic component is selected from the group consisting of diethylene glycol diacrylate and diethylene glycol dimethacrylate.

10. A foundry mix comprising:
   (a) a major amount of foundry aggregate; and
   (b) an effective bonding amount of the foundry binder system of claims 1, 2, 3, 4, 5, 6, 7, 8, or 9.

11. A cold-box process for preparing a foundry shape comprising:
   A. introducing a foundry mix of claim 10 into a pattern to form an uncured foundry shape;
   B. curing the foundry mix in the pattern by contacting it with a volatile amine curing catalyst until it becomes self-supporting; and
   C. removing the foundry shape from the pattern.

12. A foundry shape prepared in accordance with claim 11.

13. A process of casting a metal article comprising:
   a. fabricating a shape in accordance with claim 12;
   b. pouring said metal while in the liquid state into said shape;
   c. allowing said metal to cool and solidify; and
   d. then separating the molded article.

14. A metal article prepared in accordance with claim 13.

* * * * *